(12) United States Patent
Shelswell et al.

(10) Patent No.: US 8,939,456 B2
(45) Date of Patent: Jan. 27, 2015

(54) ROCKER MOLDING ATTACHMENT SYSTEM FOR AUTOMATED RUNNING BOARDS

(71) Applicant: Magna International Inc., Aurora (CA)

(72) Inventors: James Walter Shelswell, Barrie (CA); Sackda Samatchai, Kitchener (CA); Kenji Shirai, Sagamihara (JP)

(73) Assignee: Magna International Inc., Aurora (CA)

( * ) Notice: Subject to any disclaimer, the term of this patent is extended or adjusted under 35 U.S.C. 154(b) by 0 days.

(21) Appl. No.: 13/676,486

(22) Filed: Nov. 14, 2012

(65) Prior Publication Data

US 2013/0127134 A1 May 23, 2013

Related U.S. Application Data

(60) Provisional application No. 61/629,406, filed on Nov. 18, 2011.

(51) Int. Cl.
*B60R 3/02* (2006.01)
*B60R 3/00* (2006.01)

(52) U.S. Cl.
CPC .. *B60R 3/02* (2013.01); *B60R 3/002* (2013.01)
USPC .......................................... 280/166; 280/163

(58) Field of Classification Search
USPC ........... 280/163, 166; 180/90.6; 296/151, 209
See application file for complete search history.

(56) References Cited

U.S. PATENT DOCUMENTS

| | | | |
|---|---|---|---|
| 3,229,993 A * | 1/1966 | Riddle | 280/166 |
| 5,193,829 A * | 3/1993 | Holloway et al. | 280/163 |
| 5,511,750 A * | 4/1996 | Evenson | 248/200 |
| 5,823,553 A * | 10/1998 | Thompson | 280/164.1 |
| 5,895,064 A * | 4/1999 | Laubach | 280/163 |
| 6,139,089 A * | 10/2000 | Troyer | 296/180.1 |
| 6,375,207 B1 * | 4/2002 | Dean et al. | 280/166 |
| 6,663,125 B1 * | 12/2003 | Cheng | 280/166 |
| 7,111,859 B2 * | 9/2006 | Kim | 280/166 |
| 7,311,320 B2 * | 12/2007 | Kuntze et al. | 280/163 |
| 7,445,221 B2 * | 11/2008 | Kobayashi | 280/166 |
| 7,513,518 B1 * | 4/2009 | Mayville et al. | 280/163 |
| 7,823,896 B2 * | 11/2010 | VanBelle et al. | 280/166 |
| 7,900,944 B2 * | 3/2011 | Watson | 280/166 |
| 8,262,113 B1 * | 9/2012 | Chafey et al. | 280/166 |
| 2002/0158439 A1 * | 10/2002 | Benirschke | 280/163 |
| 2006/0266780 A1 * | 11/2006 | Armstrong et al. | 224/545 |
| 2007/0267842 A1 * | 11/2007 | Seibert et al. | 280/166 |
| 2010/0102528 A1 * | 4/2010 | Stickles et al. | 280/163 |
| 2010/0225082 A1 * | 9/2010 | Krosschell et al. | 280/124.1 |
| 2010/0320714 A1 * | 12/2010 | Webb et al. | 280/166 |
| 2010/0320715 A1 * | 12/2010 | Watson | 280/166 |
| 2012/0104719 A1 * | 5/2012 | Hayes | 280/163 |

* cited by examiner

*Primary Examiner* — J. Allen Shriver, II
*Assistant Examiner* — Travis Coolman
(74) *Attorney, Agent, or Firm* — Warn Partners, P.C.

(57) ABSTRACT

A mounting system used for connecting an automated running board (ARB) assembly to a vehicle. The mounting system includes a rocker stay, at least one rocker attach bracket connected to the rocker stay, and a bridge bracket. The bridge bracket is connected to an automated running board assembly, and the rocker stay is connected to the bridge bracket. The rocker stay is attached to a rocker molding of the vehicle, and the bridge bracket is attached to an outer door sill of the vehicle and the automated running board assembly, securing the mounting system to the vehicle, and the automated running board assembly to the vehicle.

6 Claims, 5 Drawing Sheets

ROCKER MOLDING ATTACHMENT SYSTEM FOR AUTOMATED RUNNING BOARDS

CROSS REFERENCE TO RELATED APPLICATIONS

This Application claims the benefit of U.S. Provisional Application No. 61/629,406, filed Nov. 18, 2011.

FIELD OF THE INVENTION

The present invention relates to a rocker molding attachment system which provides a secure mounting feature for the rocker molding by integrating the support structure for the rocker molding into the frame of an automated running board.

BACKGROUND OF THE INVENTION

Automated or "drop down" running boards are becoming increasingly common for use with sport utility vehicles, trucks, and the like. Automated running boards are typically actuated when one or more of the doors of the vehicle are opened by the driver or one of the passengers.

Automated running board assemblies include additional components compared to non-automated running boards, which are affixed to the vehicle and do not move. Some of these components include additional brackets, an actuator, such as an electric motor, linkage assemblies, and the like.

One of the problems associated with automated running boards is the inclusion of the additional components as mentioned above increases the overall weight of the automated running board assembly. The various components used for attachment of the assembly to the vehicle may not provide sufficient support for the automated running board assembly during operation.

Accordingly, there exists a need for a system for attaching an automated running board assembly to a vehicle which provides sufficient strength and support for the automated running board assembly.

SUMMARY OF THE INVENTION

The present invention is directed to a mounting system used for connecting an automated running board (ARB) assembly to a vehicle. In one embodiment, the mounting system includes a rocker stay, at least one rocker attach bracket connected to the rocker stay, and a bridge bracket. The bridge bracket is connected to an automated running board assembly, and the rocker stay is connected to the bridge bracket. The rocker stay is attached to a rocker molding of the vehicle, and the bridge bracket is attached to an outer door sill of the vehicle and the automated running board assembly, securing the mounting system to the vehicle, and the automated running board assembly to the vehicle.

In one embodiment, there are several rocker attach brackets connected to both the rocker stay and bridge bracket. Each of the rocker attach brackets includes a body portion, an outer flange portion integrally formed with the body portion, and an angled portion integrally formed with the body portion. The outer flange portion is connected to the rocker stay and the angled portion is connected to the bridge bracket when the mounting system is assembled to the rocker molding and the running board assembly.

An object of the present invention is to provide a secure attachment point for a rocker molding to the automated running board.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
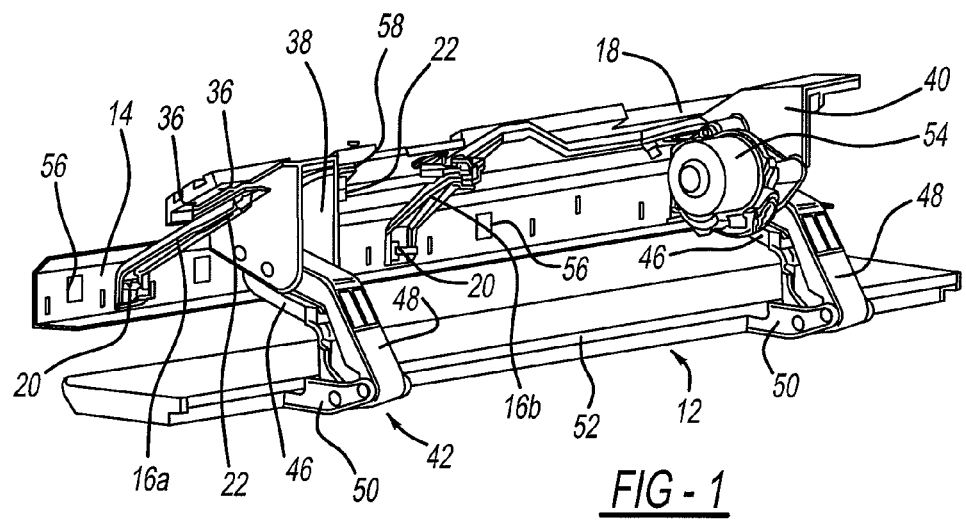
FIG. 1 is a perspective view of a mounting system used with an automated running board assembly, according to the present invention.
Figure 2:
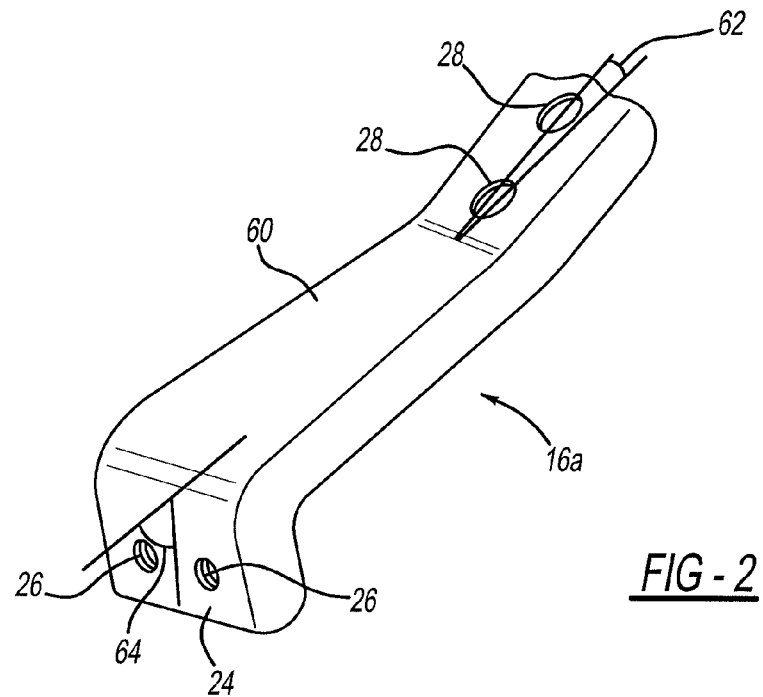
FIG. 2 is a first perspective view of a first type of rocker attach bracket which is part of mounting system used with an automated running board assembly, according to the present invention.
Figure 3:
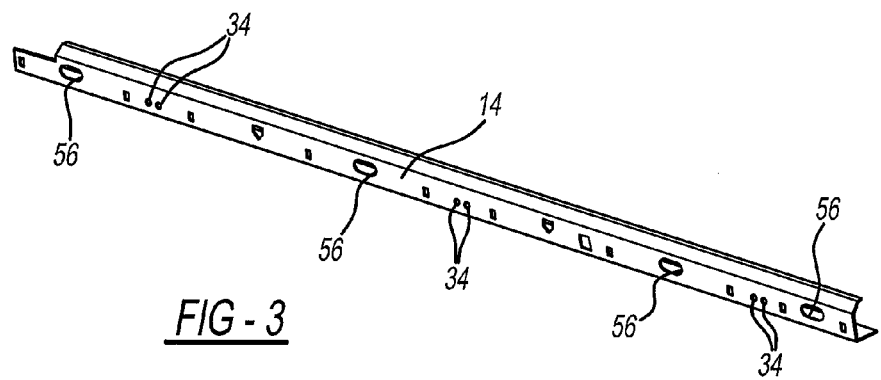
FIG. 3 is a perspective view of a rocker stay which is part of a mounting system used with an automated running board assembly, according to the present invention.

The following description of the preferred embodiment(s) is merely exemplary in nature and is in no way intended to limit the invention, its application, or uses.

An embodiment of a mounting system used for connecting an automated running board assembly to a vehicle is shown generally at 10. The system 10 is shown along with an automated running board assembly, shown generally at 12. The automated running board assembly 12 is movable between a stowed position and a deployed position, and the assembly 12 is supported and connected to the vehicle by the system 10 such that the assembly 12 is able to support the weight of passengers as the vehicle is entered and exited.

The system 10 includes a rocker stay 14, a plurality of rocker attach brackets 16, and a bridge bracket 18. Each of the rocker attach brackets 16 is attached to the rocker stay 14 by a fastener 20, which in this embodiment is a nut and bolt combination, but it is within the scope of the invention that other fasteners, such as rivets, may be used as well. A fastener 22 is also used to connect each of the rocker attach brackets 16 to the bridge bracket 18.

Figure 9:
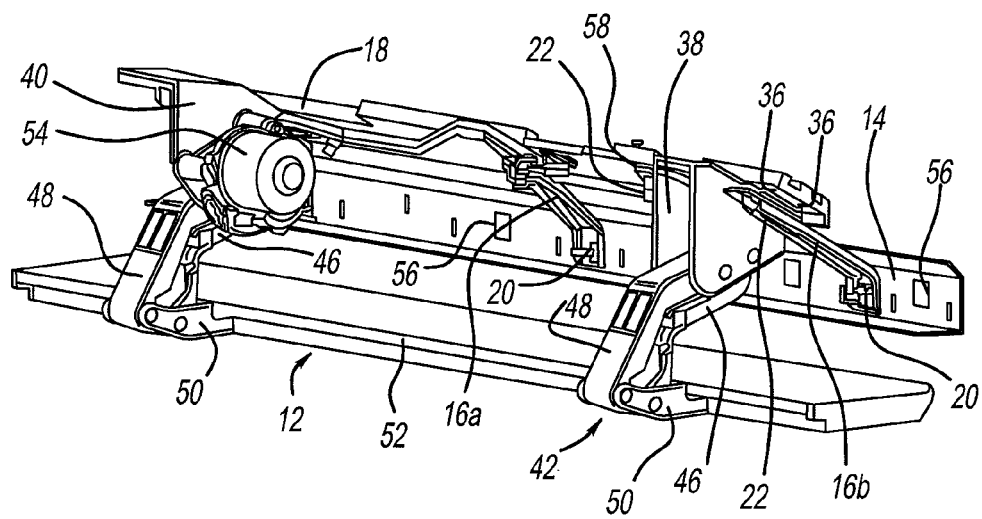
FIG. 9 is a second perspective view of a mounting system used with an automated running board assembly, according to the present invention.

In this embodiment, there are three rocker attach brackets 16 used with each automated running board assembly 12 located on each side of the vehicle. However, it is within the scope of the invention that more or less brackets 16 may be used, depending upon the length of the automated running board assembly 12, and the amount of weight the automated running board assembly 12 is designed to support. There are two types of rocker attach brackets 16, a first type of rocker attach bracket 16a, and a second type of rocker attach bracket 16b. The first type of rocker attach bracket 16a and second type of rocker attach bracket 16b are substantially mirror images of each other. It can be seen in FIGS. 1 and 9 that there are two mounting systems 10 and automated running board assemblies 12, one on each side of the vehicle. In FIG. 1, there are two of the first type of rocker attach bracket 16a at each end of the bridge bracket 18, and one of the second type of rocker attach bracket 16b located in about the middle of the bridge bracket 18. In FIG. 9, there are two of the second type of rocker attach bracket 16b at each end of the bridge bracket 18, and one of the first type of rocker attach bracket 16a located at about the middle of the bridge bracket 18.

Each of the rocker attach brackets 16a,16b have an outer flange portion 24 and a first plurality of apertures 26, through which the fasteners 20 extend. The outer flange portion 24 of the first bracket 16a (shown in FIGS. 2 and 5-8) is at an angle 64 of generally between negative thirty and negative sixty degrees relative to a body portion 60. There is also a second plurality of apertures 28 formed as part of an angled portion 32, through which fasteners 22 extend. The angled portion 32 is also formed as part of the bracket 16, and the angled portion 32 is offset at an angle 62 of generally between fifteen and forty-five degrees relative to the body portion 60. There is also a third plurality of apertures formed as part of the bridge bracket 18, through which the fasteners 22 also extend, attaching the bracket 16 to the bridge bracket 18.

Figure 4:
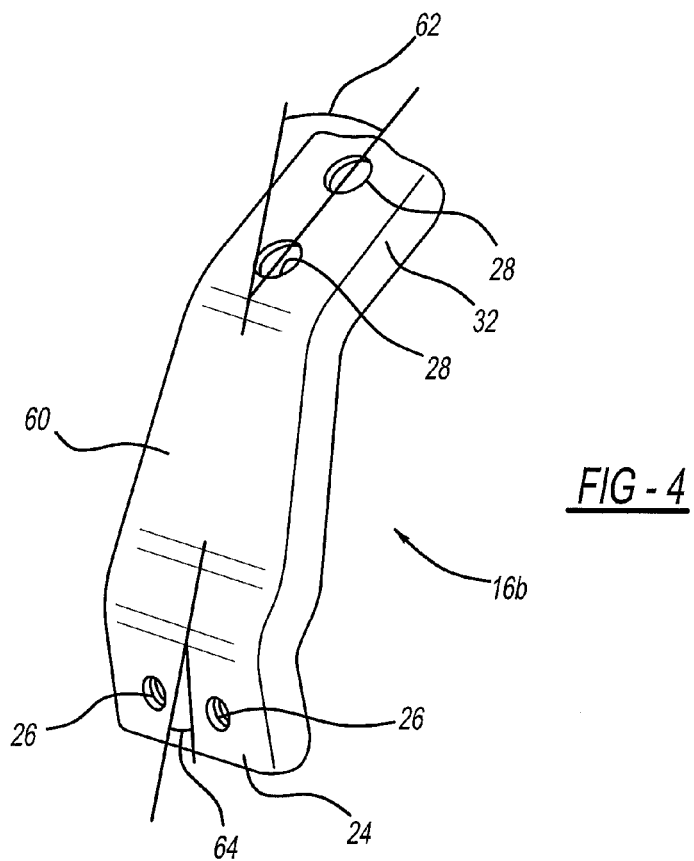
FIG. 4 is a perspective view of an alternate embodiment of a second type of a rocker attach bracket which is part of a mounting system used with an automated running board assembly, according to the present invention.
Figure 5:
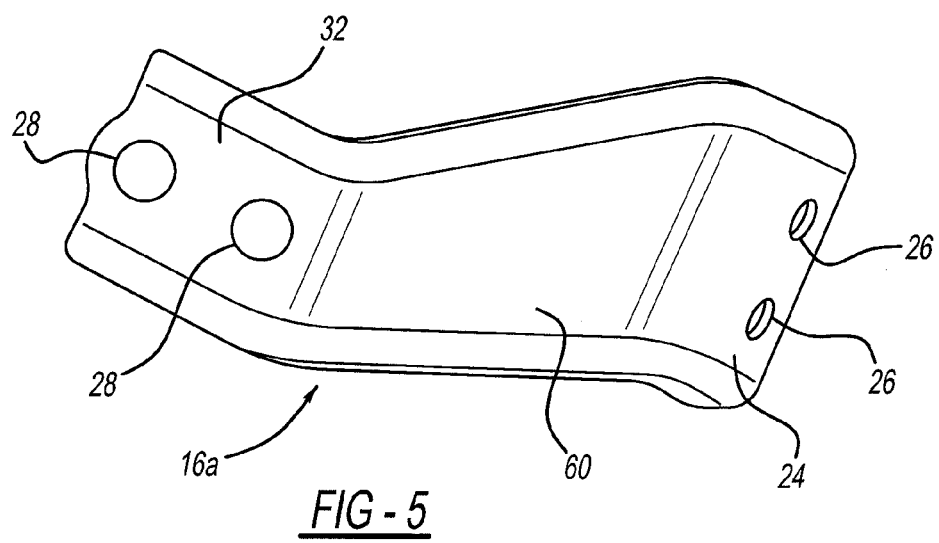
FIG. 5 is a second perspective view of a first type of a rocker attach bracket which is part of a mounting system used with an automated running board assembly, according to the present invention.
Figure 6:
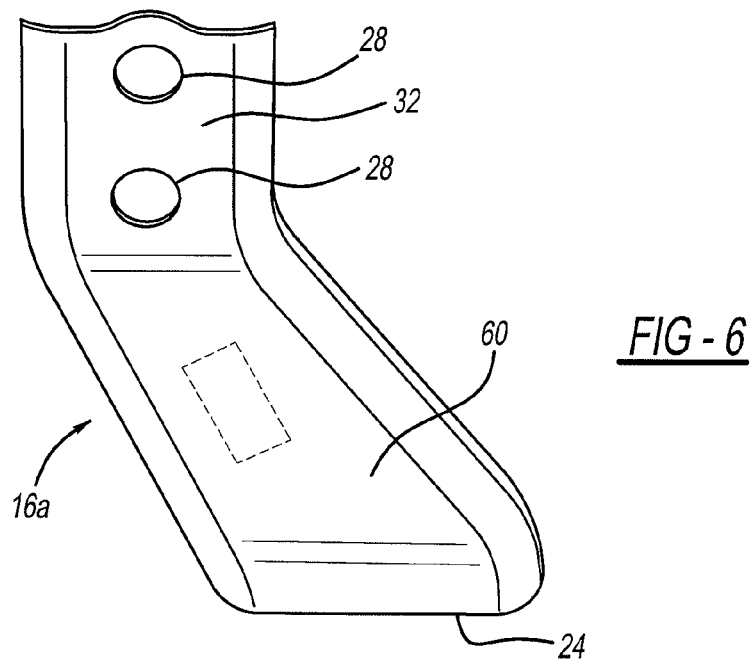
FIG. 6 is a top view of a first type of rocker attach bracket which is part of mounting system used with an automated running board assembly, according to the present invention.
Figure 7:
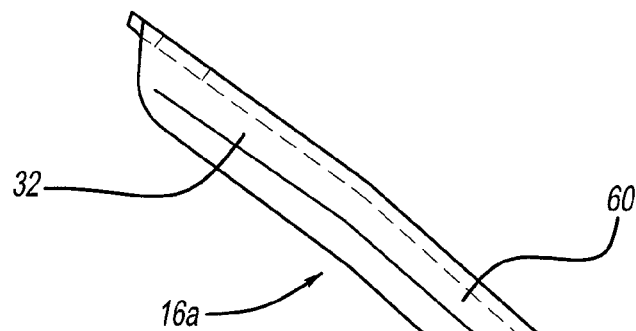
FIG. 7 is a side view of a first type of a rocker attach bracket which is part of a mounting system used with an automated running board assembly, according to the present invention.
Figure 8:
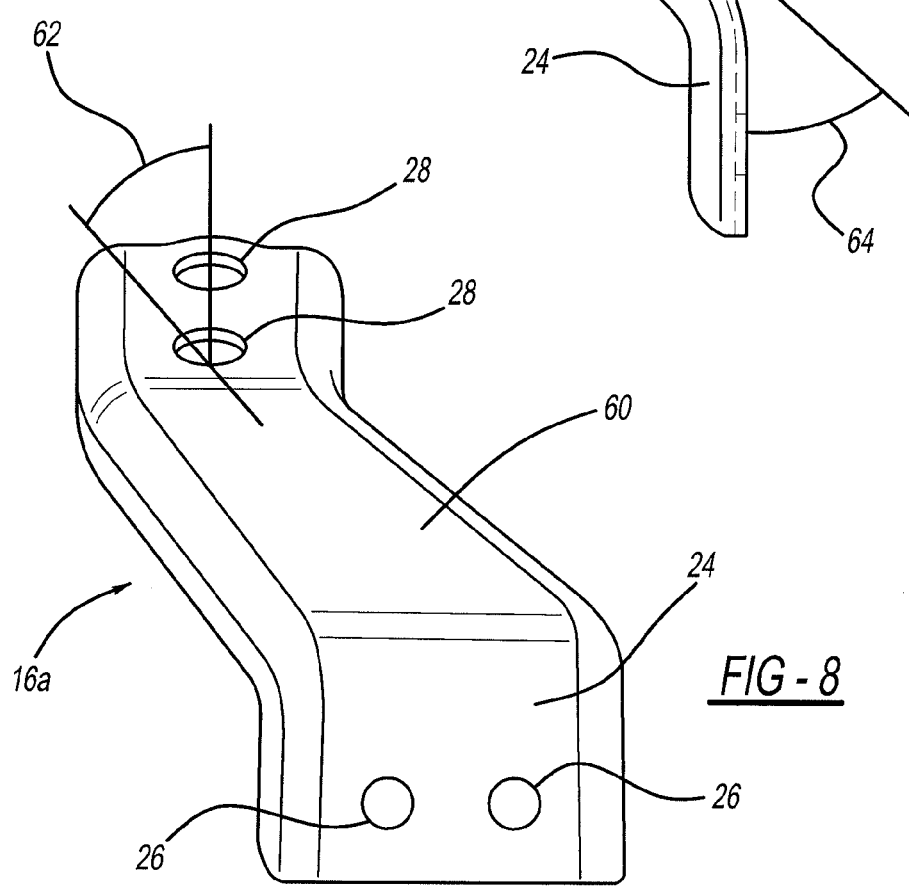
FIG. 8 is a front view of a first type of rocker attach bracket which is part of mounting system used with an automated running board assembly, according to the present invention.

An alternate embodiment of the second type of rocker attach bracket 16b is shown in FIG. 4, with like numbers referring to like elements. In this embodiment, the outer flange portion 24 is offset at an angle 64 of generally between fifteen and forty-five degrees relative to the body portion 60, and the angled portion 32 is at an angle 62 of generally between fifteen degrees and forty-five degrees relative to the body portion 60. However, changing the angles 62,64 of the outer flange portion 24 and the angled portion 32 in either of the brackets 16a,16b allows the rocker attach brackets 16a, 16b to be used with different types of vehicles having differently shaped rocker moldings, or different types of running board assemblies 12.

The outer flange portion 24 is attached to the rocker stay 14, and each fastener 20 also extends through a corresponding one of a fourth plurality of apertures 34 formed as part of the rocker stay 14, connecting the bracket 16 to the rocker stay 14, best shown in FIG. 1.

The bridge bracket 18 also includes a fifth plurality of apertures 36, through which yet another fastener (not shown) extends, to connect the bridge bracket 18 to the vehicle. More specifically, the bridge bracket 18 is connected to the door still, or alternately, may be connected to another vehicle component.

The automated running board assembly 10 includes a first base bracket 38 and a second base bracket 40. Both base brackets 38,40 are connected to the bridge bracket 18. More specifically, each of the base brackets 38,40 includes attachment flanges 58, which also have apertures (not shown) the fasteners 22 also extend through, connecting the base brackets 38,40, the angled portions 32 of rocker attach brackets 16a,16b, and the bridge bracket 18 together, best seen in FIG. 1.

Connected to the first base bracket 38 is a first linkage assembly, shown generally at 42, and connected to the second base bracket 40 is a second linkage assembly, shown generally at 44. Each linkage assembly 42,44 includes a first inner link 46 and a second inner link 48. The links 46,48 of the first linkage assembly 42 are pivotally connected to the first base bracket 38, and the links 46,48 of the second linkage assembly 44 are pivotally connected to the second base bracket 40.

Each of the linkage assemblies 42,44 also includes an outer link 50 which is pivotally connected to both of the inner links 46,48. Since there are two linkage assemblies 42,44, there are two outer links 50 which support a step portion 52. The step portion 52 is used for assisting the entering and exiting of the vehicle when the running board assembly 10 is in the deployed position.

The rocker stay 14 includes a plurality of attachment apertures 56, through which a plurality of fasteners extend to connect the rocker stay 14 to the rocker molding of the vehicle. Once the rocker stay 14 is connected to the rocker molding, and the bridge bracket 18 is connected to the outer door sill, the mounting system 10 provides a secure attachment of the running board assembly 12 to the vehicle. This provides for minimal deflection of the rocker molding when the running board assembly 12 is in use.

Movement of the inner links 46,48 and the outer link 50 is achieved through the use of an actuator, which in this embodiment is in the form of an electric motor 54 connected to the first inner link 46 of the second linkage assembly 44. The electric motor 54 is mounted to the second base bracket 40, and the second base bracket 40 is shaped differently compared to the first base bracket 38 to accommodate the mounting of the motor 54. The motor 54 may optionally include a gear train to increase the torque output of the motor 54.

The motor 54 is then actuated to pivot the first inner link 46 relative to the base bracket 40, which in turn causes the second inner link 48 and the outer link 50 to pivot as well. The inner links 46,48 and the outer link 50 are all connected to one another such that they move simultaneously in a predetermined manner when the electric motor 54 is actuated. The movement or rotation of the inner links 46,48 is dictated by the length of the links 46,48, the connection between the inner links 46,48 and the base bracket 40, as well as the connection between the inner links 46,48 and the outer link 50. This also affects the location of the deployed position of the running board assembly 12, and more specifically, the step portion 52.

The motor 54 drives the second linkage assembly 44, and the first linkage assembly 42 acts as an "idler" linkage assembly 42. The step portion 52 of the running board assembly 12 being connected to the outer link 50 of both linkage assemblies 42,44 ensures that both linkage assemblies 42,44 move in unison when the motor 54 is actuated. While one motor 54 is shown connected to one of the linkage assemblies 44, it is within the scope of the invention that two motors 54 may be used, one with each of the linkage assemblies 42,44 for providing additional force to change the running board assembly 12 between the stowed and deployed positions. The running board assembly 12 is essentially the same on both sides of the vehicle.

Further understanding of the invention can be gleaned from the attached Appendix A.

The description of the invention is merely exemplary in nature and, thus, variations that do not depart from the essence of the invention are intended to be within the scope of the invention. Such variations are not to be regarded as a departure from the spirit and scope of the invention.

What is claimed is:

1. A mounting system for connecting a running board assembly to a vehicle, comprising:
    a rocker stay;
    at least one rocker attach bracket of a first type connected to said rocker stay and at least one rocker attach bracket of a second type connected to said rocker stay;
    said at least one rocker attach bracket further comprising:
    a body portion;
    an outer flange portion integrally formed with said body portion;
    an angled portion integrally formed with said body portion at an angle of about fifteen degrees to about forty-five degrees relative to said body portion;
    a bridge bracket, said at least one rocker attach bracket of a first type and at least one attach bracket of a second type are connected to said bridge bracket;
    an automated running board assembly, said bridge bracket connected to said automated running board assembly; and
    wherein said rocker stay is attached to a rocker molding of a vehicle, and said bridge bracket is attached to an outer door sill of said vehicle and said automated running board assembly, securing said mounting system and said automated running board assembly to said vehicle;
    wherein said outer flange portion is connected to said rocker stay and said angled portion is connected to said bridge bracket when said mounting system is assembled to said rocker molding and said running board assembly.

2. The mounting system for connecting a running board assembly to a vehicle of claim 1, said first type of rocker attach bracket further comprising wherein said outer flange portion is at an angle of about negative thirty degrees to negative sixty degrees relative to said body portion.

3. A mounting system for connecting a running board assembly to a vehicle, comprising:
    a rocker stay;
    a plurality of rocker attach brackets connected to said rocker stay, wherein one of said plurality of rocker attach brackets is a first type of rocker attach bracket, and another of said plurality of rocker attach brackets is a second type of rocker attach bracket wherein at least one of said first type or second type of said rocker attach brackets comprises:
    a body portion;
    an outer flange portion integrally formed with said body portion; and
    an angled portion integrally formed with said body portion;
    wherein said angled portion is at an angle of about fifteen degrees to forty-five degrees relative to said body portion;
    a bridge bracket, said at least one rocker stay connected to said bridge bracket and at least one bracket type of a second type also connected to said bridge bracket;
    an automated running board assembly, said bridge bracket connected to said automated running board assembly;
    wherein said rocker stay is attached to a rocker molding of a vehicle, and said bridge bracket is attached to an outer door sill of said vehicle and said automated running board assembly, securing said mounting system and said automated running board assembly to said vehicle;
    wherein said outer flange portion is connected to said rocker stay and said angled portion is connected to said bridge bracket when said mounting system is assembled to said rocker molding and said running board assembly; and
    said mounting system being adaptable for mounting on either a first side of a vehicle or a second side of a vehicle by choosing a pre-selected combination of said at least first attach bracket and said at least second bracket.

4. The mounting system for connecting a running board assembly to a vehicle of claim 3, said first type of rocker attach bracket further comprising wherein said outer flange portion is at an angle of about negative thirty degrees to negative sixty degrees relative to said body portion.

5. A mounting system for connecting a running board assembly to a vehicle, comprising:
    a rocker stay;
    a plurality of rocker attach brackets connected to said rocker stay, wherein one of said plurality of rocker attach brackets is a first type of rocker attach bracket, and another of said plurality of rocker attach brackets is a second type of rocker attach bracket; said plurality of rocker attach brackets further comprise:
    a body portion;
    an outer flange portion integrally formed with said body portion; and
    an angled portion integrally formed with said body portion;
    said angled portion is at an angle of about fifteen degrees to about forty-five degrees relative to the body portion;
    a bridge bracket, said at least one rocker stay connected to said bridge bracket and at least one of said bracket attach types is connected to said bridge bracket;
    an automated running board assembly, said bridge bracket connected to said automated running board assembly;
    wherein said rocker stay is attached to a rocker molding of a vehicle, and said bridge bracket is attached to an outer door sill of said vehicle and said automated running board assembly, securing said mounting system and said automated running board assembly to said vehicle by said outer flange portion of said attach bracket being connected to said rocker stay and said angled portion of said attach bracket being connected to said bridge bracket when said mounting system is assembled to said rocker molding and said running board assembly; and
    said mounting system being adaptable for mounting on either a first side of a vehicle or a second side of a vehicle by choosing a pre-selected combination of said at least first attach bracket and said at least second bracket.

6. The mounting system for connecting a running board assembly to a vehicle of claim 5, said first type of rocker attach bracket further comprising wherein said outer flange portion is at an angle of about negative thirty degrees to negative sixty degrees relative to said body portion.

* * * * *